(12) United States Patent
Takahashi et al.

(10) Patent No.: US 8,362,668 B2
(45) Date of Patent: Jan. 29, 2013

(54) ROTOR FOR ROTATING ELECTRICAL MACHINE

(75) Inventors: Norio Takahashi, Yokohama (JP); Mikio Takabatake, Yokohama (JP); Masanori Arata, Yokohama (JP); Kazuto Sakai, Yokosuka (JP); Yutaka Hashiba, Yokosuka (JP); Wataru Ito, Inobe-gun (JP); Tadashi Tokumasu, Setagaya-ku (JP); Masakatsu Matsubara, Mie-gun (JP)

(73) Assignees: Kabushiki Kaisha Toshiba, Tokyo (JP); Toshiba Industrial Products Manufacturing Corporation, Mie-gun (JP)

( * ) Notice: Subject to any disclaimer, the term of this patent is extended or adjusted under 35 U.S.C. 154(b) by 117 days.

(21) Appl. No.: 12/745,108

(22) PCT Filed: Nov. 25, 2008

(86) PCT No.: PCT/JP2008/071294
§ 371 (c)(1),
(2), (4) Date: Jul. 2, 2010

(87) PCT Pub. No.: WO2009/069575
PCT Pub. Date: Jun. 4, 2009

(65) Prior Publication Data
US 2010/0301697 A1 Dec. 2, 2010

(30) Foreign Application Priority Data
Nov. 28, 2007 (JP) ................................ 2007-307943

(51) Int. Cl.
H02K 21/14 (2006.01)
H02K 21/12 (2006.01)
H02K 1/22 (2006.01)

(52) U.S. Cl. ......... 310/156.47; 310/156.53; 310/156.57; 310/216.004

(58) Field of Classification Search ............. 310/156.53, 310/156.47, 156.54, 156.55, 156.56, 156.57, 310/216.004, 216.011–216.012, 216.074
See application file for complete search history.

(56) References Cited

U.S. PATENT DOCUMENTS
(Continued)

FOREIGN PATENT DOCUMENTS
JP 2000 308287 11/2000
JP 2004 343915 12/2004
(Continued)

OTHER PUBLICATIONS

Sakai, K. et al., "High Efficiency and High Performance Motor for Energy Saving in Systems" IEEE PES Winter Meeting. Ohio, USA, 6 pages, Jan. 2001.

(Continued)

*Primary Examiner* — Quyen Leung
*Assistant Examiner* — Leda Pham
(74) *Attorney, Agent, or Firm* — Oblon, Spivak, McClelland, Maier & Neustadt, L.L.P.

(57) ABSTRACT

A rotor for a rotating electrical machine suppresses demagnetization of permanent magnets without deteriorating motor characteristics, is low-cost, and is highly reliable. The rotor has a plurality of rotor cores that are stacked together, a plurality of permanent magnets axially divided by the rotor cores and circumferentially arranged on each of the rotor cores, to circumferentially form magnetic irregularities, and a rotor blank made of nonmagnetic material arranged between those of the rotor cores that are adjacent to each other.

6 Claims, 16 Drawing Sheets

U.S. PATENT DOCUMENTS

| | | | |
|---|---|---|---|
| 6,876,115 B2 * | 4/2005 | Takahashi et al. | 310/156.47 |
| 2008/0218022 A1 * | 9/2008 | Lee et al. | 310/156.53 |
| 2009/0127962 A1 * | 5/2009 | Ohyama et al. | 310/156.53 |

FOREIGN PATENT DOCUMENTS

| | | |
|---|---|---|
| JP | 2004-343915 | 12/2004 |
| JP | 2005 51897 | 2/2005 |
| JP | 2005 57865 | 3/2005 |
| JP | 2005-218228 | 8/2005 |
| JP | 2005 218228 | 8/2005 |
| JP | 2005 261169 | 9/2005 |
| JP | 2006 158037 | 6/2006 |
| WO | WO 2006/085440 | 8/2006 |
| WO | WO 2006085440 A1 * | 8/2006 |

OTHER PUBLICATIONS

Hisada, Hideki et al., "AISIN AW New Full Hybrid Transmission for FWD Vehicles", SAE International, Detroit, USA, pp. 55-60, Apr. 2005.

Office Action issued Aug. 7, 2012 in Japanese Patent Application No. 2007-307943 with English language translation.

Office Action issued Apr. 28, 2012, in Chinese Patent Application No. 200880115872.5 (with English-language Translation).

* cited by examiner (a)

(b)

(a)

(b)

(a)

DIVISIONAL PLANE

DIVISIONAL PLANE

ROTOR FOR ROTATING ELECTRICAL MACHINE

TECHNICAL FIELD

The present invention relates to a rotor for a rotating electrical machine, and particularly, to a rotor for a rotating electrical machine, capable of suppressing demagnetization of permanent magnets without deteriorating motor characteristics, being highly reliable, and being manufactured at low cost.

BACKGROUND TECHNOLOGY

In recent years, permanent magnets have keenly been studied and developed to provide permanent magnets having high magnetic energy product for promoting compactness and high output of rotating electrical machines. In particular, rotating electrical machines for vehicles such as hybrid cars are strongly required to suppress exhaust gas, reduce fuel consumption, and improve efficiency. They are also required to reduce installation spaces, fit in limited spaces, and provide high torque and high output. To achieve them, rotating electrical machines of high energy density that need large current and magnetomotive force are expected. Realizing such rotating electrical machines, however, involves various problems.

For example, a rotating electrical machine with a rotor in which permanent magnets of high magnetic energy product are embedded produces large electromagnetic exciting force to cause vibration and noise. A rotating electrical machine for a hybrid vehicle is particularly required to realize quietness in a cabin and reduce noise to the outside. These issues must be solved.

Japanese Unexamined Patent Application Publication No. 2005-51897 (Patent Document 1) describes a rotor for a reluctance-type rotating electrical machine that achieves an effect similar to a skew effect, to reduce torque ripples, vibration, and noise. This rotor for a reluctance-type rotating electrical machine includes a rotor core formed by laminating many annular core materials whose outer circumferential parts are provided with alternating magnetic irregularities, an inner circumferential part of the rotor core being provided with an axially extending key, and a rotary shaft inserted into the inner circumferential part of the rotor core and having a key groove on an outer circumferential part thereof. The rotor core is divided into a plurality of blocks. At least among three of the blocks, the core materials that form one block are structured such that the magnetic irregularities are shifted by a predetermined angle toward one of a rotation direction and counter rotation direction with respect to a center line passing through the key. On each end of this block, the core materials of each adjacent block are formed such that the magnetic irregularities are shifted by a predetermined angle toward the other of the rotation direction and counter rotation direction with respect to the center line passing through the key.

FIG. 15 is a diametrical sectional view of the rotor described in the Patent Document 1. In an outer circumferential part of a block 3, a pair of magnet insertion holes 5 each substantially having a rectangular shape is formed such that a distance between the holes 5 gradually extends toward an outer circumference. Permanent magnets 6 are inserted into the magnet insertion holes 5 and are fixed thereto with an adhesive or a filler. In the vicinity of the outer circumference of the block 3, a hollow 7 is formed between the pair of permanent magnets 6. The hollow 7 is substantially triangular with two sides being in parallel with the pair of permanent magnets 6 and one side extending along the outer circumference.

In the block 3, a section including a pair of the magnet insertion holes 5, a pair of the permanent magnets 6, and the hollow 7 is a magnetic recess (q-axis, inter-pole section) 8 where magnetic flux hardly passes and a section between adjacent magnetic recesses 8 is a magnetic projection (d-axis, pole section) 9 where magnetic flux easily passes. The magnetic recesses 8 and magnetic projections 9 are alternately formed at intervals of predetermined angles. On an inner circumference of the block 3, two axially extending keys 30 and 31 are formed at intervals of 180 degrees.

In the block 3, a center line Lo passing through the centers of the keys 30 and 31 passes thorough the magnetic projections 9. The center line Lo deviates by an angle of $\Delta\theta$ from a center line Loa passing through the centers of the magnetic projections 9. Namely, the center line Loa is present at a position shifted from the center line Lo by the angle $\Delta\theta$ in a direction (clockwise direction) opposite to a rotation direction X. The center line Loa and a center line Lb that is adjacent to the center line Loa and passes through the centers of the magnetic recesses 8 form a predetermined angle of $\theta$.

FIG. 16 is a partial top view of the rotor described in the Patent Document 1. The rotor has the rotor core formed by laminating many annular core materials such as silicon steel plates. The rotor core is divided into four blocks 3 and 4 having an equal thickness, the four blocks being stacked together. As illustrated in FIG. 16, the blocks 3 and 4 have center lines Lb and Lc having linear loci that are zigzagged without forming a prior-art-like straight line. As a result, the rotor provides an effect similar to a skew effect provided by a rotor for a squirrel-cage induction motor. Deviations of the center lines Lb and Lc must be ±0 (equally shifted in "+" and "−" directions).

The rotor is arranged in a stator which is not illustrated and around which a stator coil is wound, to thereby form the rotating electrical machine. In the rotating electrical machine, the rotor has the magnetic recess (q-axis) that hardly passes magnetic flux and the magnetic projection (d-axis) that easily passes magnetic flux. Spaces above the magnetic recess and projection accumulate different amounts of magnetic energy when a current is passed through the stator coil and the magnetic energy variation generates reluctance torque. The rotor also has the permanent magnets 6. Magnetic attraction and repulsion between the permanent magnets 6 and the magnetic poles of the stator generate torque. As a result, the rotor rotates in the stator.

At this time, magnetic flux at ends of each permanent magnet embedded in the rotor similarly acts with respect to the stator coil. Namely, with respect to a current passing through the stator coil, the magnetic flux at ends of each permanent magnet acts to cancel, in terms of direction and amount, an action of leakage flux of the permanent magnet, thereby suppressing axial vibration.

In this way, according to the rotor for a reluctance-type rotating electrical machine described in the Patent Document 1, a locus of a center line passing through magnetic recesses in at least one block is shifted from that of each adjacent block, to provide an effect similar to the skew effect of a rotor for a squirrel-cage induction motor and reduce torque ripples, vibration, and noise.

However, the rotating electrical machine that is compact and provides high output and high energy density has other problems in addition to the above-mentioned vibration and noise. The rotating electrical machine needs large current and magnetomotive force to provide high torque and high output.

The large current passing through the armature coil applies an armature reactive magnetic field to the permanent magnets, thereby causing a problem of demagnetization of the permanent magnets.

FIG. 17 is an external view illustrating a rotor for a permanent-magnet rotating electrical machine according to the related art. The rotor 1 has a rotor core 2 and permanent magnets 6. The rotor core 2 has easy axes of magnetization and hard axes of magnetization. To create magnetic irregularities, the rotor core 2 is formed by laminating electromagnetic steel plates having permanent magnet embedding holes in which the permanent magnets 6 are embedded along the easy axes of magnetization. The permanent magnets 6 arranged in the permanent magnet embedding holes are magnetized to cancel magnetic flux of armature current passing through adjacent inter-pole sections. Namely, the two permanent magnets 6 on each side of a pole section have the same magnetization direction and the two permanent magnets 6 on each side of an inter-pole section have opposite magnetic directions with respect to a circumferential direction of the rotor 1.

The rotor core 2 described in the Patent Document 1 and illustrated in FIG. 17 is divided into a plurality (two in FIG. 17) of blocks that are stacked together. The rotor core 2 divided into the blocks has magnetic poles 17 that are shifted from each other, and with the bound stepped skew, reduces torque ripples, vibration, and noise. As illustrated in FIG. 17, a divisional skew plane 16 indicates a divisional plane of the rotor core 2 consisting of the stacked blocks.

FIG. 18 is an axially sectioned perspective view of the rotor for a permanent-magnet rotating electrical machine according to the related art. As illustrated in FIG. 18, end faces of the permanent magnet 6 are in contact with the rotor core 2. Accordingly, a demagnetizing field from the rotor core 2 due to an armature reaction acts on the end faces and corners of the permanent magnet 6. These locations are vulnerable to demagnetization, and therefore, cause demagnetization of the permanent magnet 6. FIG. 19 is a magnetic flux density distribution of the permanent magnet 6 of the permanent-magnet rotating electrical machine according to the related art. As illustrated in FIG. 19, the permanent magnet 6 has a demagnetization location 18 on an end face thereof.

A rotating electrical machine without skew also has problems mentioned below. FIG. 20 is an axial sectional view of a rotor for a permanent-magnet rotating electrical machine according to a related art. A rotor core 2 without skew is axially divided to avoid eddy current and secure strength. As illustrated in FIG. 20, a permanent magnet 6 is axially divided. If the permanent magnet 6 is magnetized in advance (premagnetized magnet), the permanent magnet 6 produces a gap 15 because it axially repulses at the divisional plane when assembled.

FIG. 21 is an enlarged axial section illustrating the rotor for a permanent-magnet rotating electrical machine according to the related art. If the rotating electrical machine is operated with the gap 15 produced between the two permanent magnets 6, the rotor core 2 applies demagnetizing field flux 26 due to an armature reaction to an end face (demagnetization occurring location 27) of the permanent magnet 6 that is vulnerable to demagnetization. The end face (demagnetization occurring location 27) of the permanent magnet 6 facing the gap 15 easily causes demagnetization.

FIG. 22 is a view illustrating a permanent magnet demagnetization state of the permanent-magnet rotating electrical machine according to the related art. Demagnetization locations 28 are locations on the permanent magnet 6 that are vulnerable to demagnetization.

To prevent demagnetization, there is an idea of thickening the magnets. The material cost of the permanent magnets occupies 30% to 40% of the cost of the rotating electrical machine, and therefore, the quantity of the permanent magnets must be minimized in terms of cost.

[Patent Document 1] Japanese Unexamined Patent Application Publication No. 2005-51897

DISCLOSURE OF INVENTION

In consideration of the problems of the related art, an object of the present invention is to provide a rotor for a rotating electrical machine, capable of suppressing demagnetization of permanent magnets without deteriorating motor characteristics and being low-cost and highly reliable.

The present invention provides a rotor for a rotating electrical machine, having a plurality of rotor cores that are stacked together and a plurality of permanent magnets axially divided by the rotor cores and circumferentially arranged on each of the rotor cores, to circumferentially form magnetic irregularities. Between adjacent ones of the rotor cores, there is arranged a rotor blank made of nonmagnetic material.

The rotor for a rotating electrical machine according to the present invention can suppress demagnetization of the permanent magnets without deteriorating motor characteristics even if there is a gap between the permanent magnets at a divisional plane of the rotor.

Also, the present invention provides a rotor for a rotating electrical machine, having a plurality of rotor cores that are stacked together and a plurality of permanent magnets axially divided by the rotor cores and circumferentially arranged on each of the rotor cores, to circumferentially form magnetic irregularities. The plurality of permanent magnets are circumferentially shifted rotor core by rotor core by a predetermined angle, to form a skew structure and are spaced from the axially facing rotor cores.

The rotor for a rotating electrical machine according to the present invention can suppress demagnetization of the permanent magnets without deteriorating motor characteristics even when the permanent magnets of the rotor form the skew structure.

BEST MODE OF IMPLEMENTING INVENTION

Embodiments of the present invention will be explained in detail with reference to the drawings.

Embodiment 1

Figure 1:
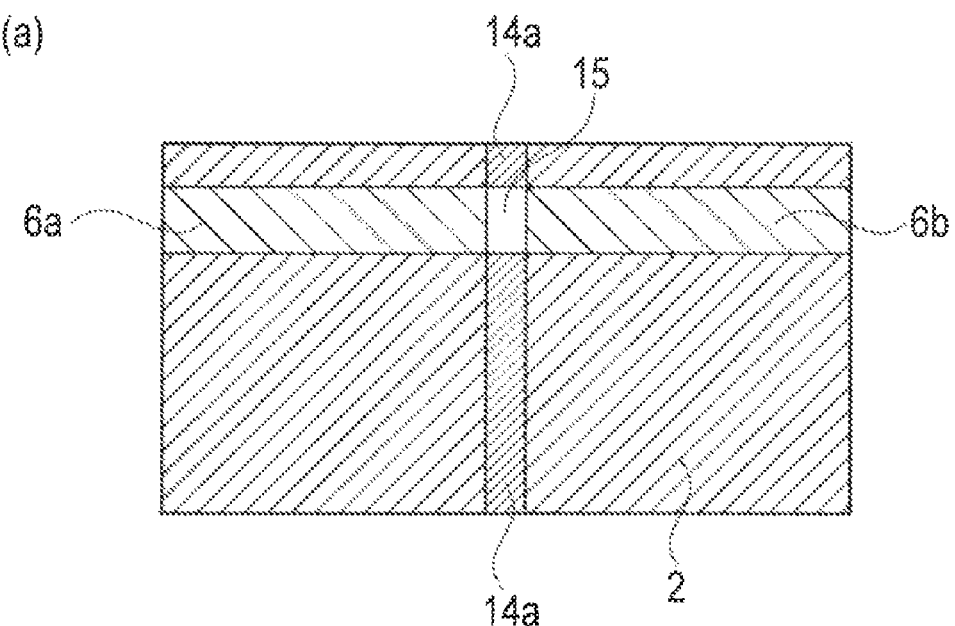
FIG. 1 is an axial section of a rotor for a rotating electrical machine according to Embodiment 1 of the present invention and an external view of a rotor blank.
Figure 1:
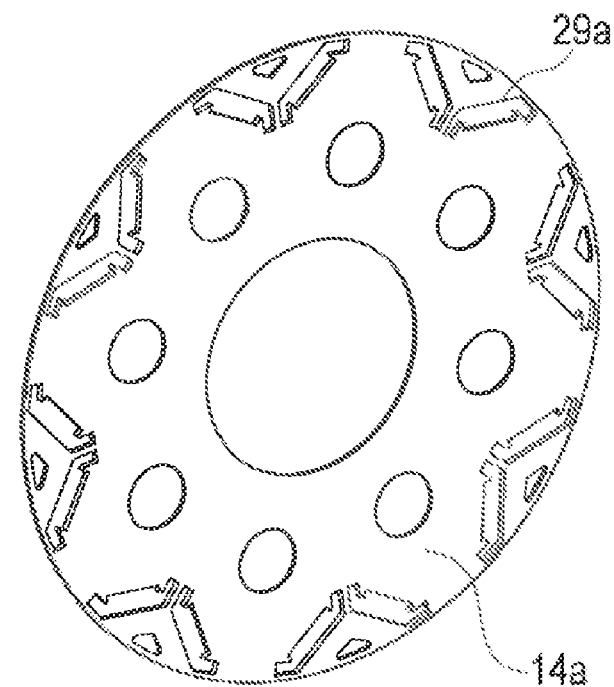

First, a configuration of Embodiment 1 will be explained with reference to FIGS. 1 to 3. Although the embodiment is described in connection with a permanent-magnet, reluctance-type rotating electrical machine having an 8-pole rotor, the present invention is executable on any rotating electrical machine employing permanent magnets without regard to the number of poles. The same or equivalent structural elements as those of the related art of FIGS. 15 to 22 are represented with the same reference marks, to omit repetition of explanation.

Figure 2:
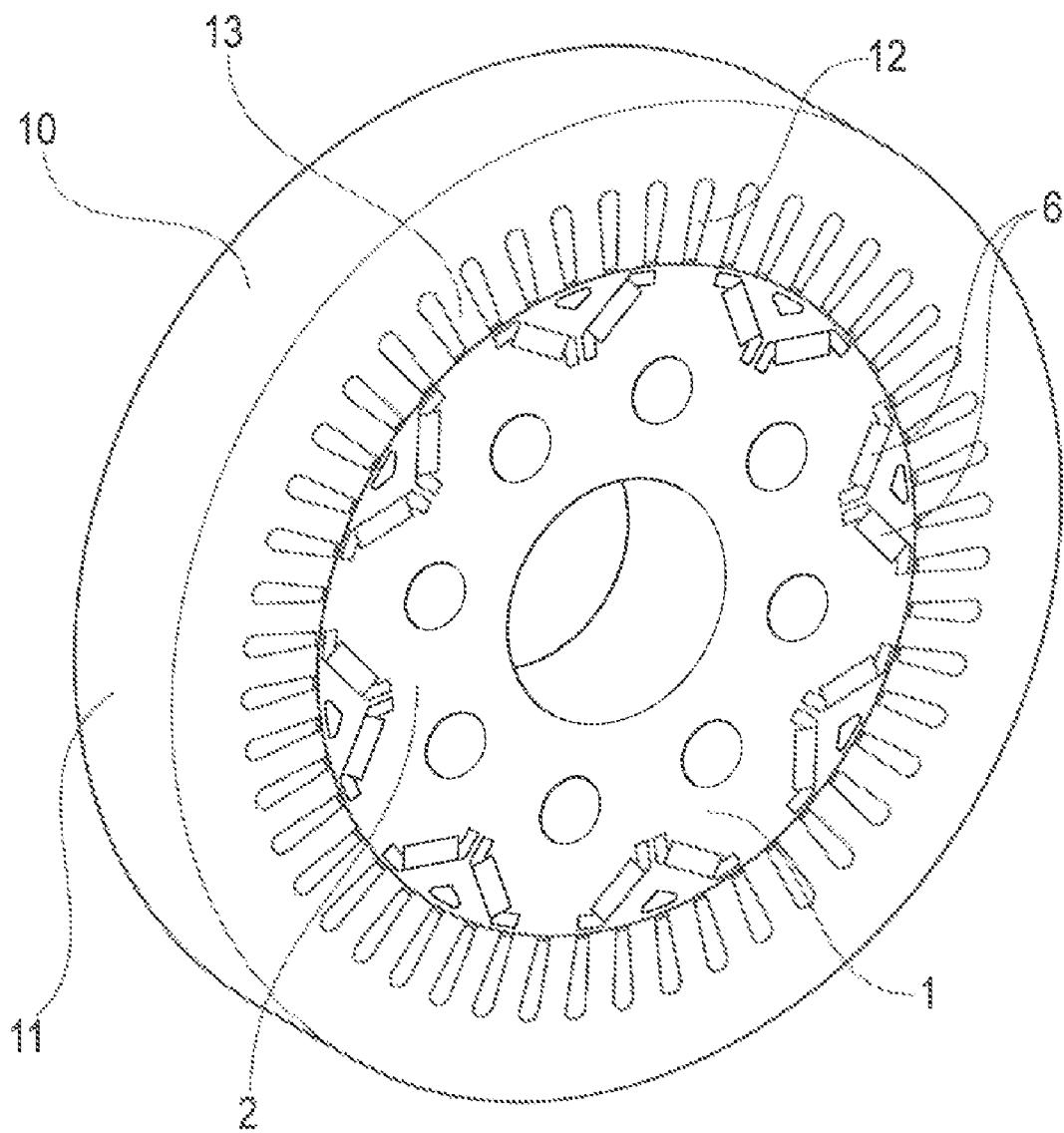
FIG. 2 is an external view of the rotating electrical machine according to Embodiment 1 of the present invention.
Figure 3:
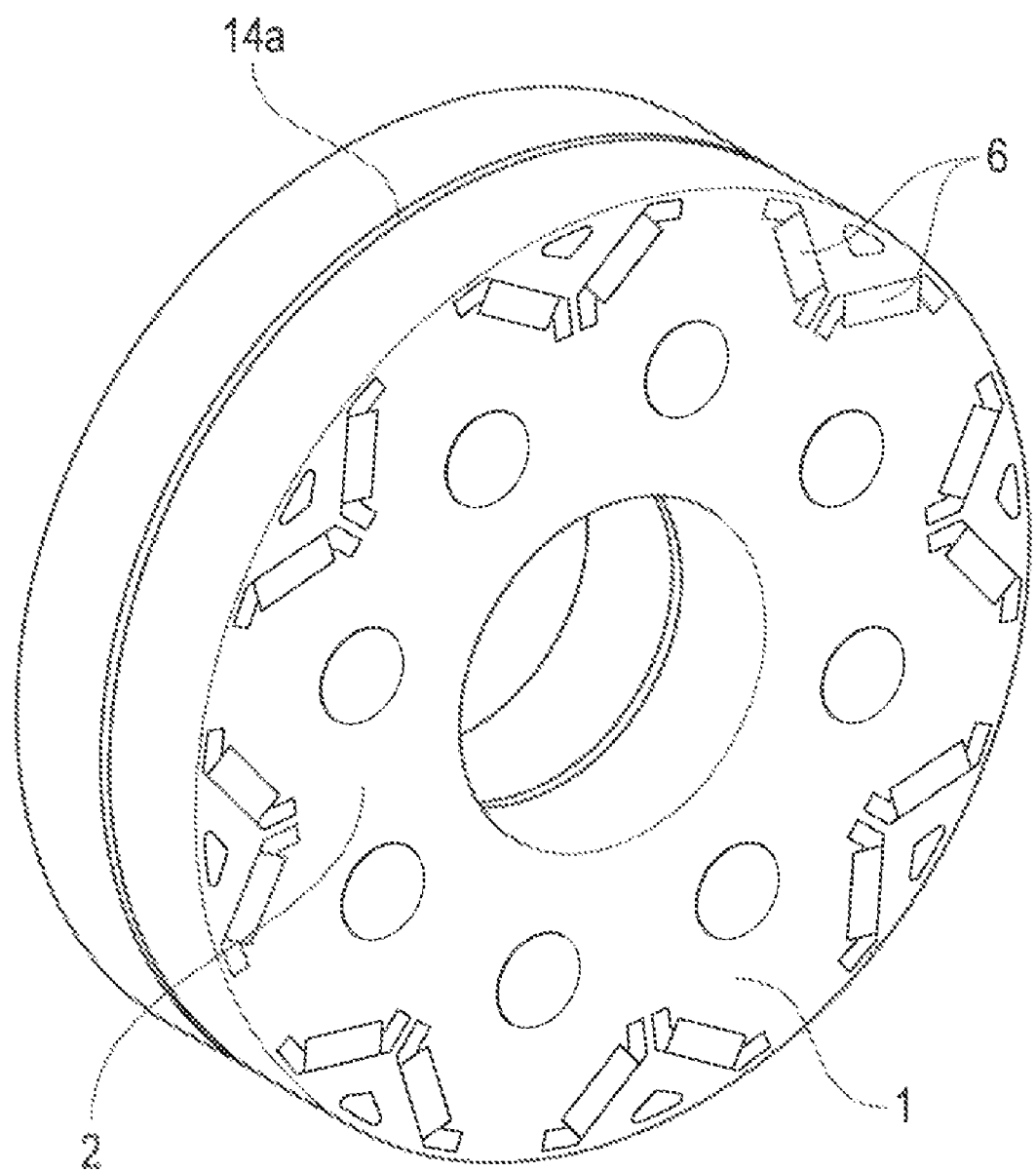
FIG. 3 is an external view of the rotor for the rotating electrical machine according to Embodiment 1 of the present invention.

As illustrated in FIG. 2, a stator 10 includes a stator core 11 and an armature coil 12. The stator core 11 is a lamination of electromagnetic steel plates, and on inner circumferential side thereof, there are stator slots accommodating the armature coil 12 and stator teeth 13 facing a rotor 1. The rotor 1 is arranged on an inner side of the stator 10 and has rotor cores 2 and permanent magnets 6. Between the rotor 1 and the stator teeth 13, there is a gap (air gap).

The rotor 1 for the rotating electrical machine includes a plurality of the rotor cores 2 that are stacked together. On each of the rotor cores 2, a plurality of the permanent magnets 6 are circumferentially arranged. The permanent magnets 6 are axially divided by the rotor cores and circumferentially form magnetic irregularities. As illustrated in FIG. 3, a plane that axially divides the permanent magnets 6 is provided with a rotor blank 14a. The rotor 1 is constituted with a plurality of the rotor cores 2 each being a block and the permanent magnets 6 are axially divided by the blocks. Each rotor core block is formed with an electromagnetic steel plate or a plurality of electromagnetic steel plates that are laminated.

The rotor 1 has permanent magnet embedding holes along easy axes of magnetization and the permanent magnets 6 are embedded in the holes and are fixed thereto with an adhesive, to form eight magnetic projection poles and magnetic irregularities on an outer circumferential face. The permanent magnets 6 are inserted into the permanent magnet embedding holes in such a way as to cancel magnetic flux of armature current that crosses magnetic flux passing through a pole section and generating reluctance torque and suppress a leakage magnetic field at an end of a magnetic pole. Namely, the permanent magnets 6 on each side of a pole section have the same magnetization direction and the permanent magnets 6 on each side of an inter-pole section have opposite magnetization directions with respect to a circumferential direction of the rotor 1.

In this way, the rotor 1 circumferentially has the magnetic irregularities, and due to a rotating magnetic field produced by a current passing through the armature coil 12 of the stator core 11, rotates around a rotor shaft.

Each rotor core 2 consists of a lamination of electromagnetic steel plates and alternately has easy axes of magnetization and hard axes of magnetization in a circumferential direction around a rotation axis. To produce the magnetic irregularities, the rotor core 2 is constituted by laminating the electromagnetic steel plates each having the permanent magnet embedding holes that are formed to receive the permanent magnets on a side face of a magnetic pole to generate reluctance torque according to a direction (easy axis of magnetization) of magnetic flux that passes through the magnetic pole and generates the reluctance torque.

The rotor blank 14a is arranged between adjacent block-like rotor cores 2 and is made of nonmagnetic material. As illustrated in FIGS. 1(a) and 1(b), the rotor blank 14a has permanent magnet holes 29a at positions where the permanent magnets 6 are axially close to each other. The permanent magnets 6a and 6b that face each other on each side of the permanent magnet hole 29a form a gap 15. The permanent magnets 6a and 6b are those among the plurality of permanent magnets 6. This is also true in the below-mentioned embodiments. The nonmagnetic material is, for example, copper or stainless steel.

As illustrated in FIG. 1(a), the permanent magnet 6 is axially divided by the rotor cores 2 into the permanent magnets 6a and 6b. On the divisional plane, there is the axial gap 15. Since the rotor blank 14a is placed on the divisional plane, the gap 15 corresponds to the permanent magnet hole 29a of the rotor blank 14a. When the permanent magnets 6a and 6b are magnetized in advance (premagnetized magnets), the permanent magnets 6a and 6b axially repels each other at the time of assembling, to create the gap 15 at the divisional plane.

Next, operation of the embodiment with the above-mentioned configuration will be explained. As illustrated in FIG. 1(a), the divisional plane of the rotor cores 2 and permanent magnets 6 is provided with the rotor blank 14a made of nonmagnetic material. When the rotating electrical machine is operated with the gap 15 being present between the two permanent magnets 6a and 6b, demagnetizing magnetic field flux applied by armature reaction from the nonmagnetic material of the rotor blank 14a to end faces of the permanent magnets 6a and 6b is very weak, unlike the related art explained with reference to FIG. 21. Accordingly, the end faces of the permanent magnets 6a and 6b facing the gap 15 hardly cause demagnetization compared with the related art.

As mentioned above, the rotor for a rotating electrical machine according to Embodiment 1 of the present invention has the gap 15 between the permanent magnets 6a and 6b on the divisional plane of the rotor cores 2. Even with the gap, the embodiment can suppress demagnetization of the permanent magnets 6a and 6b without deteriorating motor characteristics and improve reliability. This is particularly effective when the permanent magnets 6a and 6b are magnetized in advance (premagnetized magnets), to unavoidably cause the gap 15.

The embodiment only inserts the rotor blank 14a made of nonmagnetic material along the divisional plane of the rotor cores 2, to realize a simple structure and suppress demagnetization at low cost.

Embodiment 2

Figure 4:
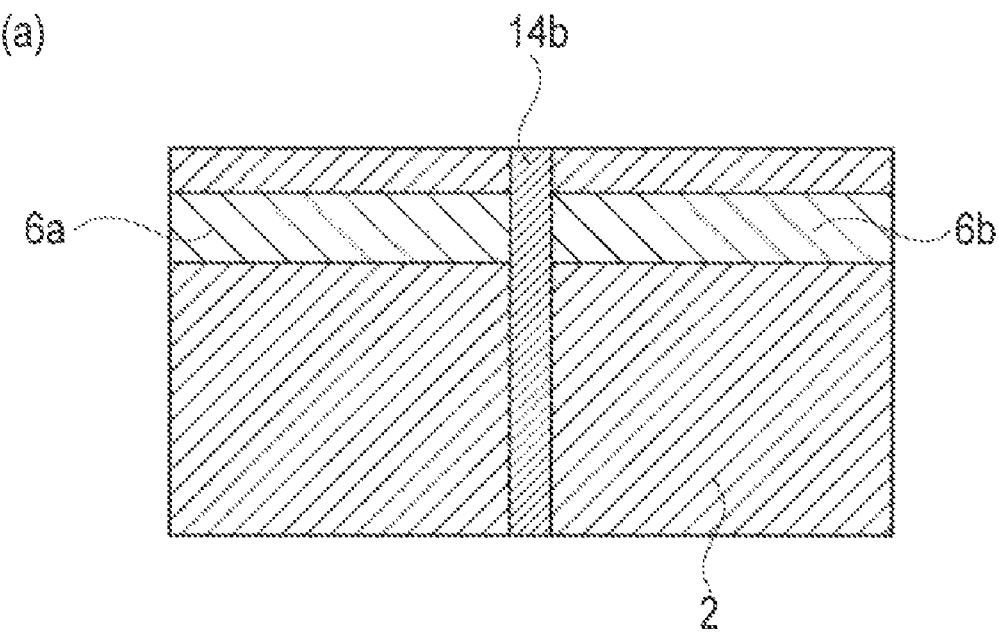
FIG. 4 is an axial section of a rotor for a rotating electrical machine according to Embodiment 2 of the present invention and an external view of a rotor blank.
Figure 4:
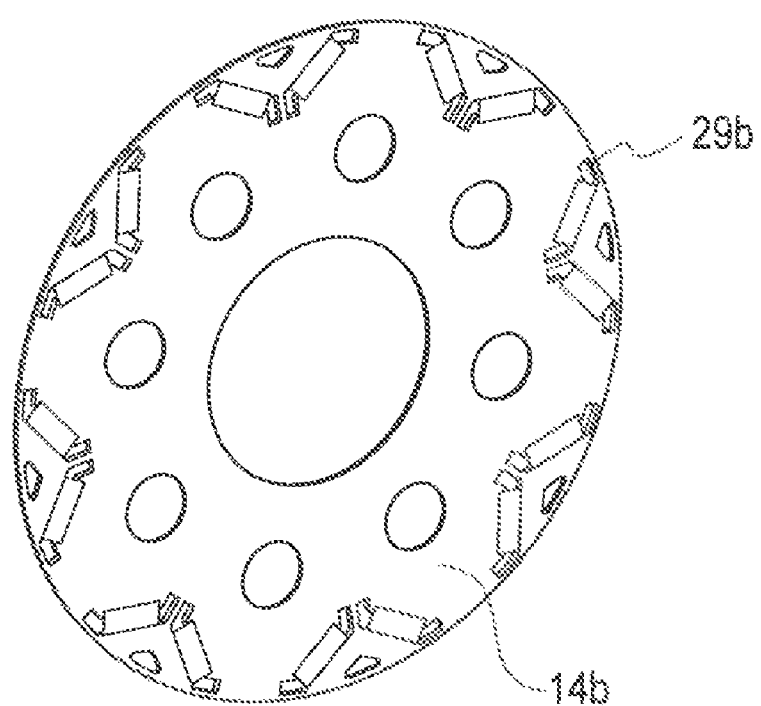

With reference to FIGS. 4(a) and 4(b), a rotating electrical machine according to Embodiment 2 of the present invention will be explained. In FIGS. 4(a) and 4(b), the same or equivalent structural elements as those of FIG. 1 are represented with the same reference marks, to omit repetition of explanation.

Basically, the configuration is the same as that of Embodiment 1. A rotor 1 has a plurality of rotor cores 2 that are stacked together and a plurality of permanent magnets 6 that are axially divided by the rotor cores 2 and are circumferentially arranged on each rotor core 2, to circumferentially form magnetic irregularities. A plane that axially divides the permanent magnets 6 is provided with a rotor blank 14b made of nonmagnetic material.

Embodiment 2 differs from Embodiment 1 in that a permanent magnet hole 29b of the rotor blank 14b is filled with nonmagnetic material. As illustrated in FIG. 4(a), there is no gap between the permanent magnets 6a and 6b and the nonmagnetic material of the rotor blank 14b is present there. In other words, the rotor blank 14b is made of nonmagnetic material without a gap at a position where the permanent magnets 6a and 6b axially meet.

Next, operation of Embodiment 2 with the above-mentioned configuration will be explained. As illustrated in FIG. 4(a), the divisional plane of the rotor cores 2 and permanent magnets 6 is provided with the rotor blank 14b made of nonmagnetic material. The gap between the two permanent magnets 6a and 6b is filled with the nonmagnetic material. When the rotating electrical machine is operated, demagnetizing field flux applied due to an armature reaction from the nonmagnetic material of the rotor blank 14b to end faces of the permanent magnets 6a and 6b is very weak compared with the related art explained with reference to FIG. 21 and Embodiment 1. Accordingly, the end faces of the permanent magnets 6a and 6b hardly cause demagnetization.

When assembling, the permanent magnets 6a and 6b are fixed to the nonmagnetic material interposed between them. Unlike the related art and Embodiment 1, there is no gap 15, and therefore, it is easy to axially position the permanent magnets 6. If there is the gap 15, there is a possibility that the positions of the permanent magnets 6a and 6b are shifted toward the gap 15. According to this embodiment, the permanent magnets 6 never axially move or displace because the nonmagnetic material is present at the divisional plane.

As mentioned above, the rotor for a rotating electrical machine according to Embodiment 2 of the present invention places the nonmagnetic material along the divisional plane of the rotor cores 2 between and around the permanent magnets 6a and 6b. Accordingly, the embodiment can suppress demagnetization of the permanent magnets 6a and 6b without deteriorating motor characteristics and improve reliability. This is particularly effective when the permanent magnets 6a and 6b are magnetized in advance (premagnetized magnets), to inevitably create the gap 15. Like Embodiment 1, Embodiment 2 is achievable only by inserting the rotor blank 14a made of nonmagnetic material along the divisional plane of the rotor cores 2. This is a simple structure that can suppress demagnetization at low cost.

Even if an adhesive to fix the permanent magnets 6 to the rotor cores 2 deteriorates or even during the assembling of the premagnetized permanent magnets 6, the permanent magnets 6 are easily and accurately set at axial positions because there is no gap 15 on the divisional plane. This results in simplifying assembling steps including fine adjustment of the positions of the permanent magnets, reducing costs, and improving reliability.

Embodiment 3

With reference to FIGS. 5 to 8, a configuration of Embodiment 3 of the present invention will be explained. The same or equivalent structural elements as those of the related art of FIGS. 15 to 22 and Embodiments 1 and 2 of FIGS. 1 to 4 are represented with the same reference marks, to omit repetition of explanation.

Figure 5:
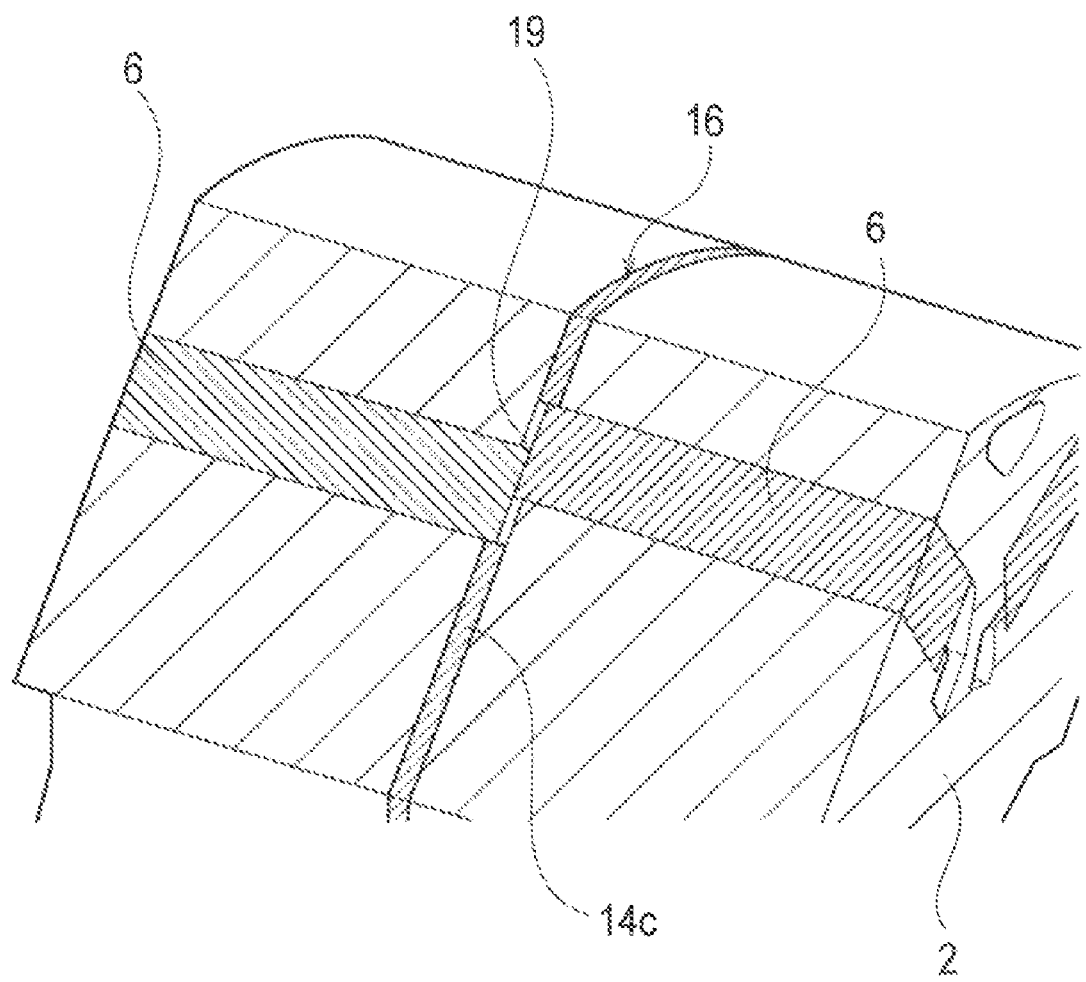
FIG. 5 is an axially sectioned perspective view of a rotor for a rotating electrical machine according to Embodiment 3 of the present invention.

A rotor 1 has a plurality of rotor cores 2 that are stacked together and a plurality of permanent magnets that are axially divided by the rotor cores 2 and are circumferentially arranged on each rotor core 2, to circumferentially form magnetic irregularities. As illustrated in FIG. 5, the divisional plane (divisional skew plane 16) that axially divides the permanent magnets 6 has a rotor blank 14c.

Figure 17:
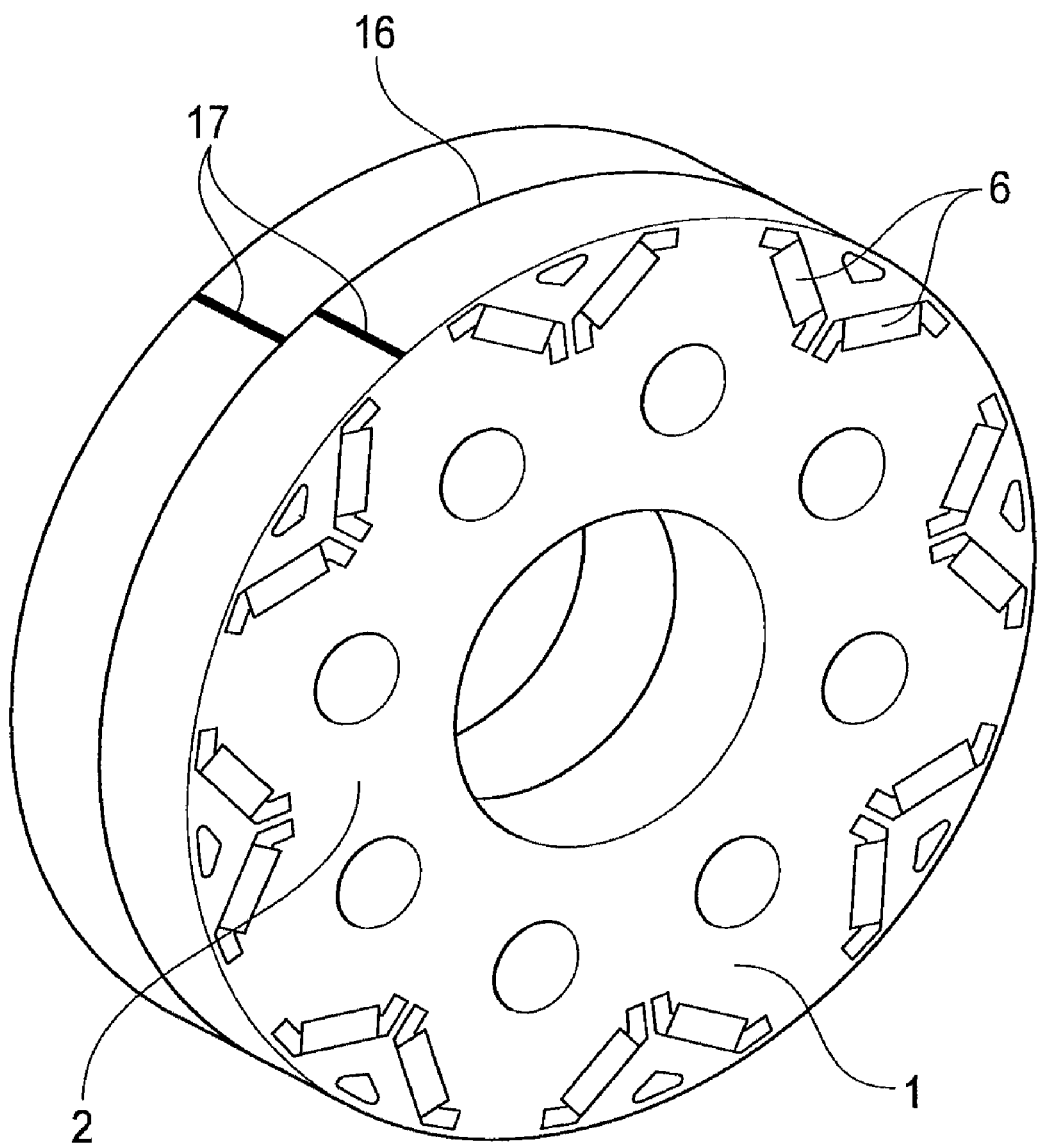
FIG. 17 is an external view of a rotor for a permanent-magnet rotating electrical machine according to the related art.
Figure 18:
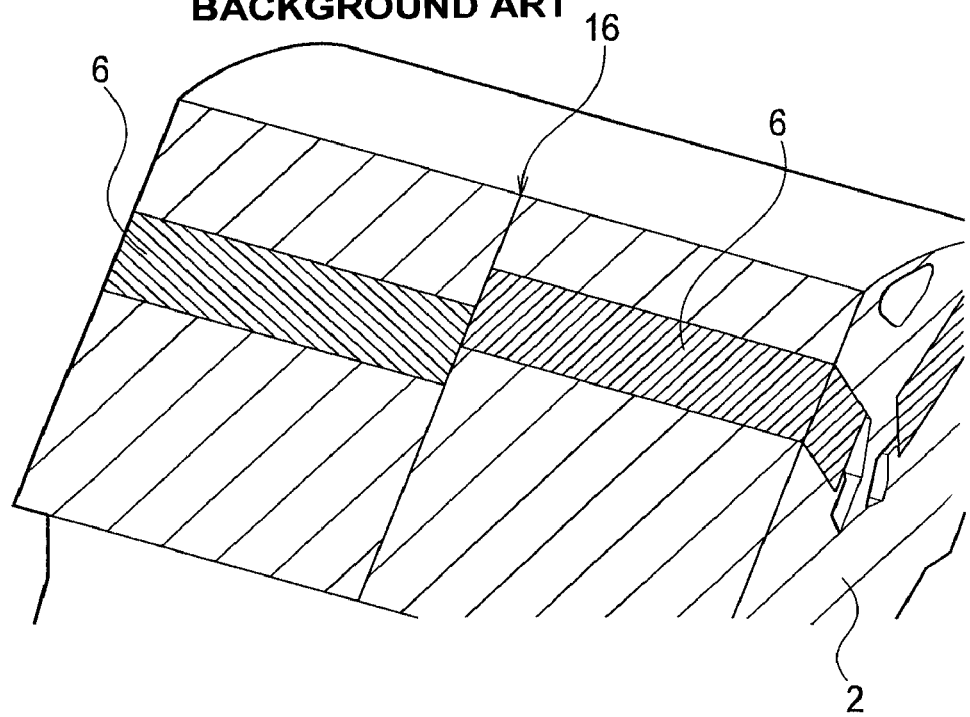
FIG. 18 is an axially sectioned perspective view of the rotor for a permanent-magnet rotating electrical machine according to the related art.
Figure 19:
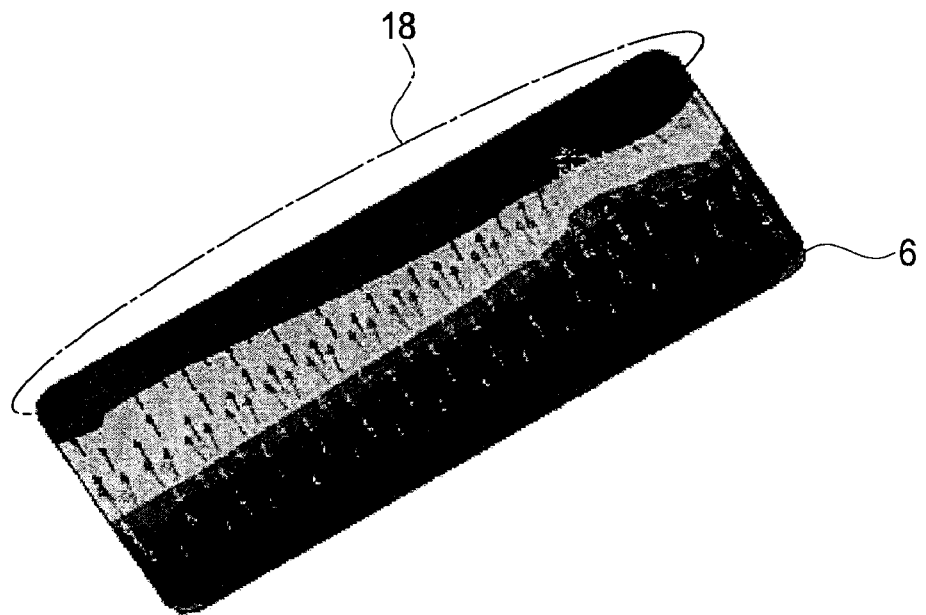
FIG. 19 is a view illustrating a magnetic flux density distribution of permanent magnets of the permanent-magnet rotating electrical machine according to the related art.
Figure 20:
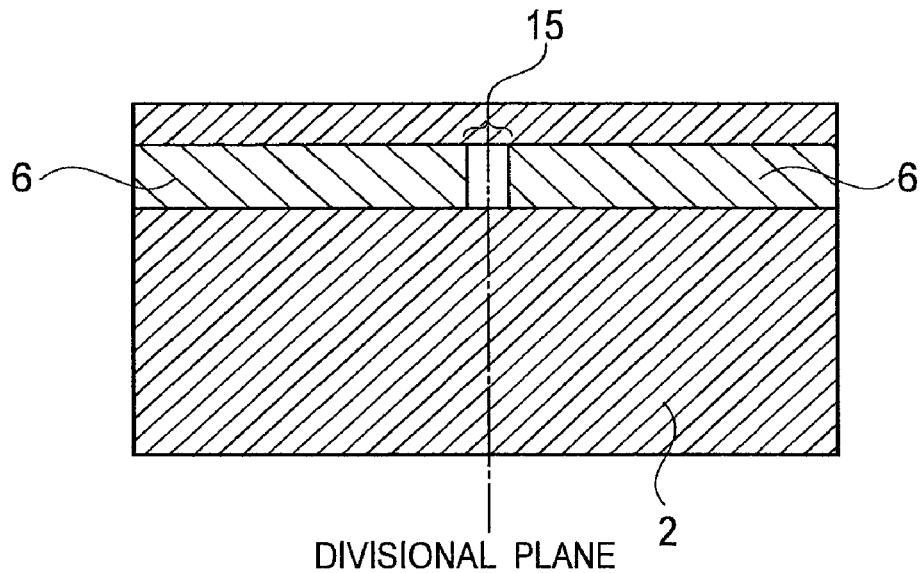
FIG. 20 is an axial section of the rotor for the permanent-magnet rotating electrical machine according to the related art.
Figure 21:
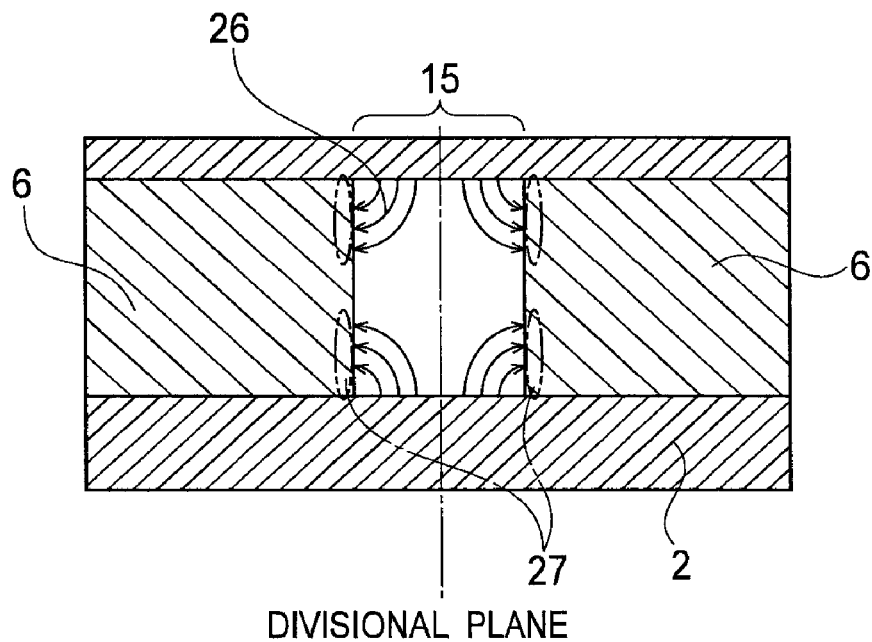
FIG. 21 is an enlarged axial section of the rotor for the permanent-magnet rotating electrical machine according to the related art.
Figure 22:
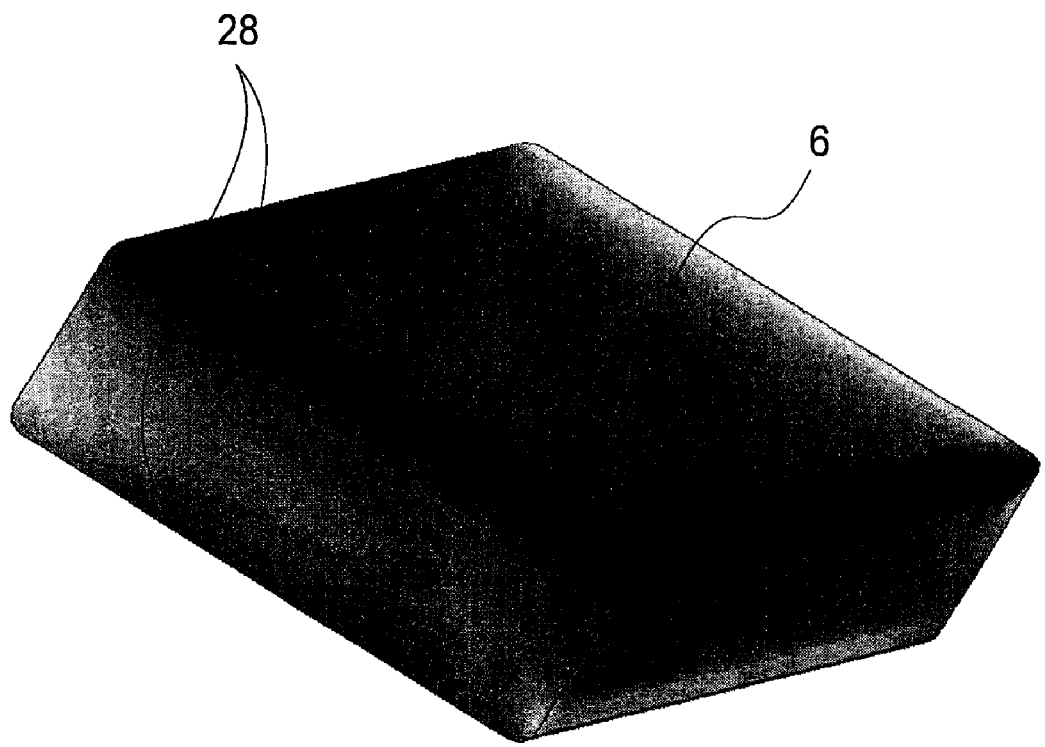
FIG. 22 is a view illustrating a permanent magnet demagnetization state of the permanent-magnet rotating electrical machine according to the related art.

According to Embodiment 3, the rotor cores 2 are stacked together like the related art explained with reference to FIG. 17. The block-like rotor cores 2 are arranged in such a way that magnetic poles are circumferentially shifted from each other, to provide the rotor 1 with bound stepped skews. As illustrated in FIG. 5, the rotor blank 14c is arranged between adjacent ones (divisional skew plane 16) of the block-like rotor cores 2 that are stacked together. Namely, the permanent magnets 6 each form a skew structure (stepped skew) having a predetermined circumferential skew angle for each rotor core 2. Each permanent magnet 6 is spaced from the rotor core 2 that axially faces the permanent magnet 6.

Figure 6:
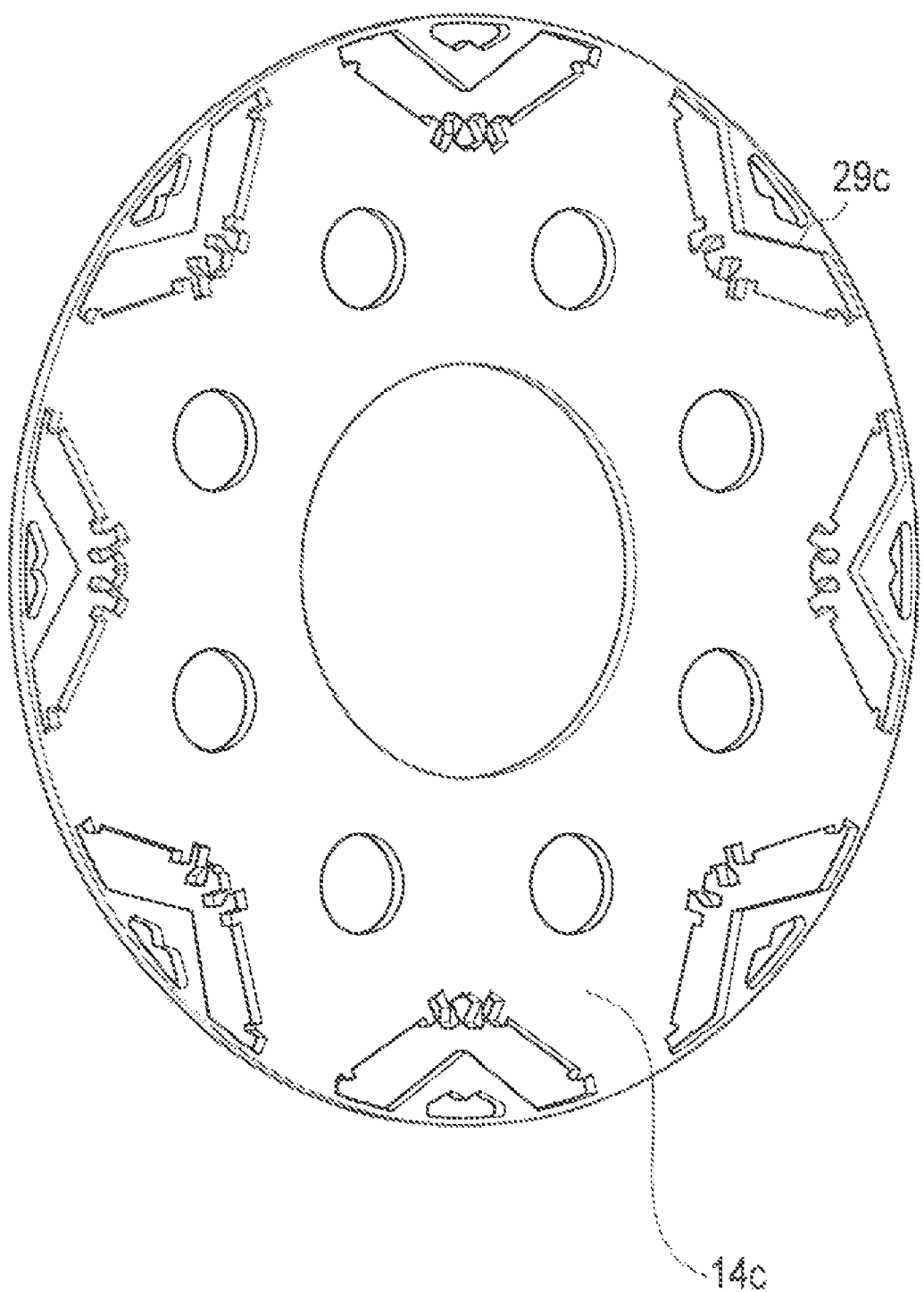
FIG. 6 is an external view of a rotor blank according to Embodiment 3 of the present invention.
Figure 7:
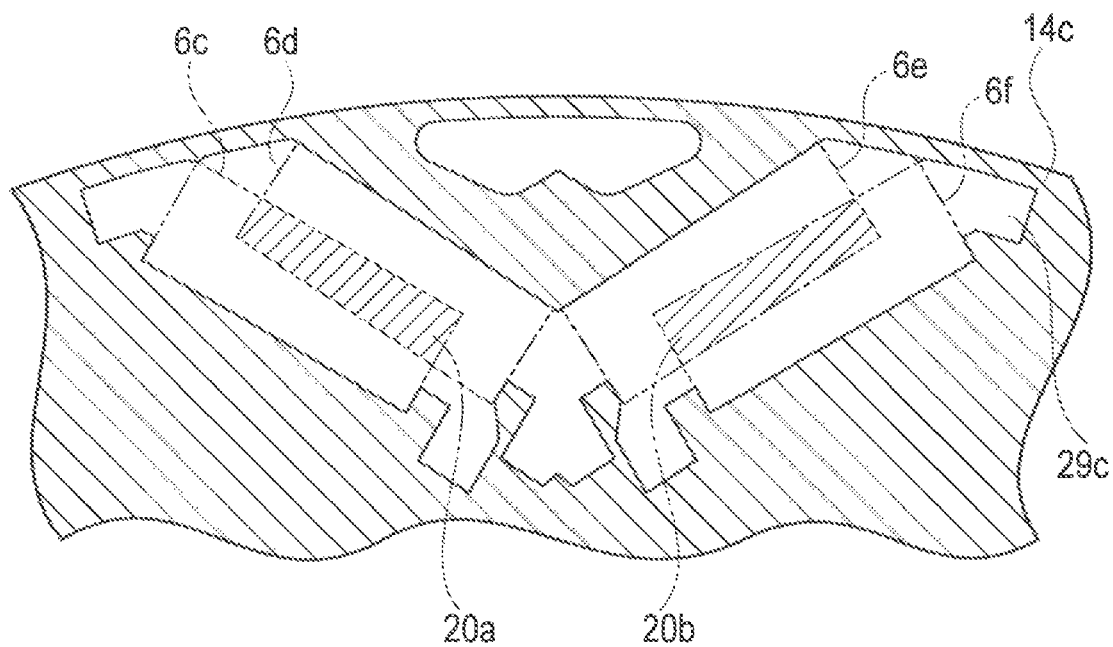
FIG. 7 is an enlarged view of the rotor blank according to Embodiment 3 of the present invention.

The rotor blank 14c has a permanent magnet hole 29c at a position where the axially adjacent permanent magnets 6 meet. Accordingly, as illustrated in FIG. 6, the permanent magnet hole 29c is larger than the permanent magnet holes 29a and 29b, to accept both the adjacent permanent magnets 6 that form a skew structure. More precisely, as illustrated in FIG. 7, the permanent magnet hole 29c of the rotor blank 14c is sized to accept the permanent magnets 6c and 6e adjacent to one face of the rotor blank 14c, as well as the permanent magnets 6d and 6f adjacent to the other face of the rotor blank 14c. As illustrated in FIGS. 5 and 7, the permanent magnets 6c and 6d are in contact with each other in the permanent magnet hole 29c. The contact position is a permanent magnet contact part 20a illustrated in FIG. 7. Similarly, the permanent magnets 6e and 6f are in contact with each other in the permanent magnet hole 29c. The contact position is a permanent magnet contact part 20b illustrated in FIG. 7.

As illustrated in FIG. 5, the permanent magnets 6 that axially face each other partly get in contact with each other (permanent magnet contact part 20*a* or 20*b*). However, they are spaced from the axially facing rotor cores 2, to form a gap 19.

The rotor blank 14*c* according to Embodiment 3 is made of nonmagnetic material. The remaining configuration of Embodiment 3 is the same as Embodiment 1 and repetition of explanation is omitted.

Figure 8:
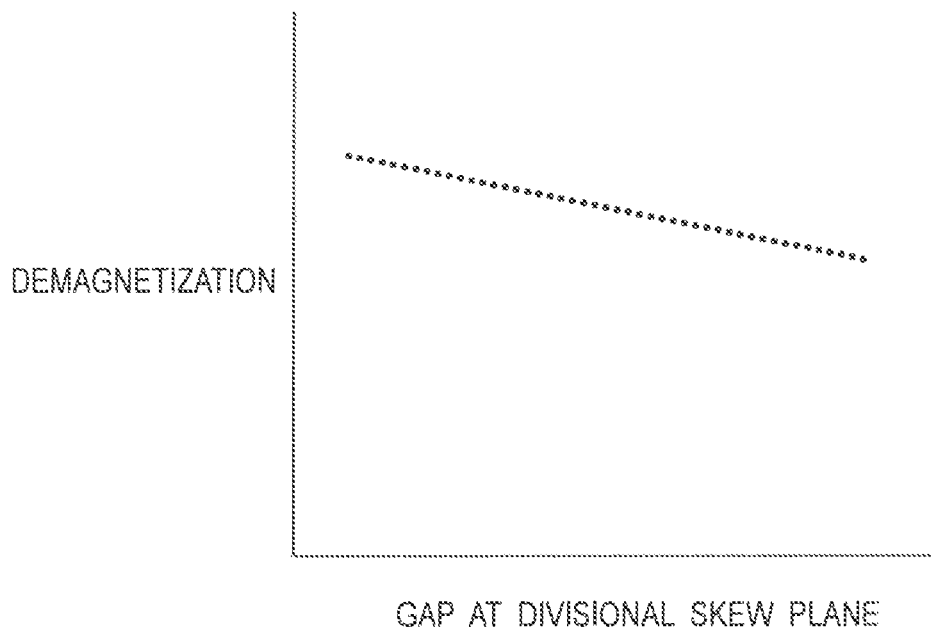
FIG. 8 is a view illustrating a relationship between a gap on a divisional skew plane in the rotor for a rotating electrical machine according to Embodiment 3 of the present invention.

Next, operation of Embodiment 3 with the above-mentioned configuration will be explained. As mentioned above, the permanent magnets 6 that axially face each other are spaced from the rotor cores 2 that axially face the permanent magnets, to form the gap 19. When the rotating electrical machine is operated, the gap 19 prevents a demagnetizing field that is caused by an armature reaction and is applied at the divisional skew plane 16 from the rotor cores 2 to end faces of the permanent magnets 6. As illustrated in FIG. 8, the larger the gap 19 at the divisional skew plane 16, the more the demagnetization at the end faces of the permanent magnets 6 is suppressed.

The rotor blank 14*c* according to Embodiment 3 is made of nonmagnetic material. It may be made of the same material as the rotor cores 2. In this case, it must have the permanent magnet hole 29*c* conforming to the permanent magnets 6 that axially adjoin. Because of the permanent magnet hole 29*c*, the permanent magnets 6 can form the gap 19 at the divisional skew plane 16 with respect to the axially-opposing rotor cores 2. If there is no permanent magnet hole 29*c*, the permanent magnets 6 are axially in contact with the rotor blank 14*c* whose material is the same as that of the rotor cores 2, demagnetization will not be suppressed. The rotor blank 14*c* made of nonmagnetic material according to Embodiment 3 can suppress a demagnetizing field that is caused by an armature reaction and is applied from the rotor cores 2 to end faces of the permanent magnets 6.

As mentioned above, the rotor for a rotating electrical machine according to Embodiment 3 of the present invention separates the permanent magnets 6 that axially face each other from the rotor cores 2 that axially face the permanent magnets 6, to form the gap 19. This prevents a demagnetizing field acting on the permanent magnets 6, thereby suppressing the demagnetization of the permanent magnets 6 and improving reliability. This is particularly effective when the permanent magnets 6 are magnetized after assembling (postmagnetized magnets) and when a skew structure is employed.

The rotor blank 14*c* arranged along the division skew plate 16 can be made of the same material as the rotor cores 2. This reduces material cost. The rotor blank 14*c* arranged along the divisional skew plane 16 may be made of nonmagnetic material. This further reduces a demagnetizing field acting on the permanent magnets 6, thereby suppressing the demagnetization of the permanent magnets 6 and further improving reliability.

Embodiment 4

Figure 9:
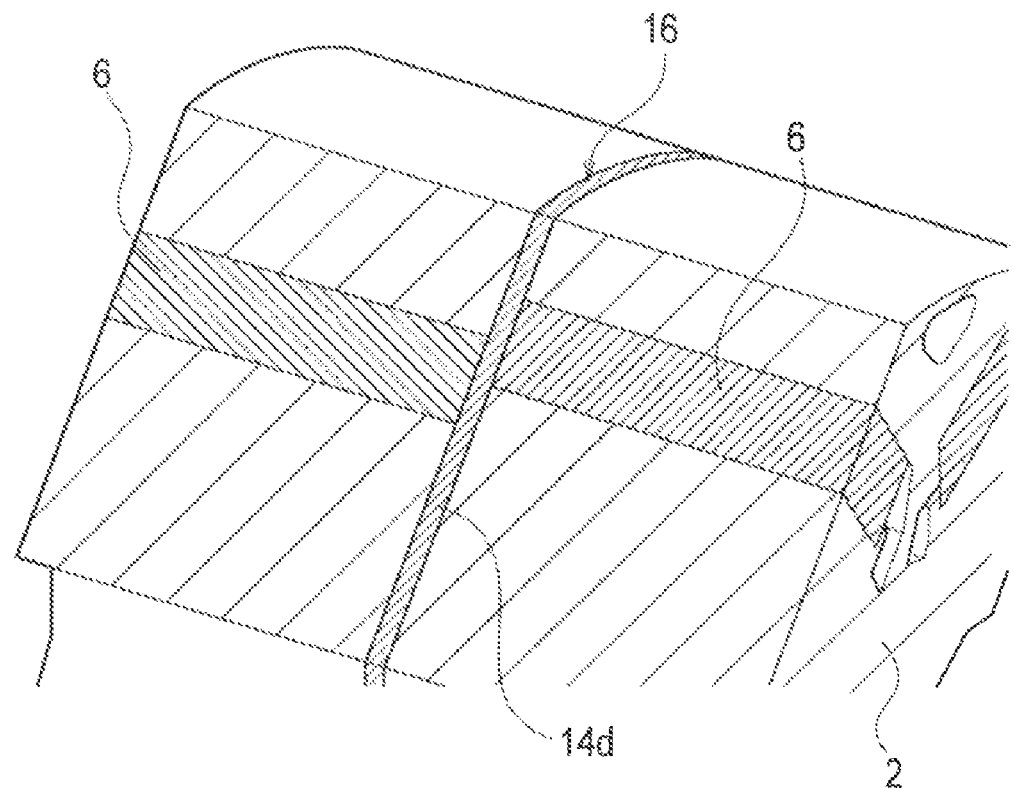
FIG. 9 is an axially sectioned perspective view of a rotor for a rotating electrical machine according to Embodiment 4 of the present invention.
Figure 10:
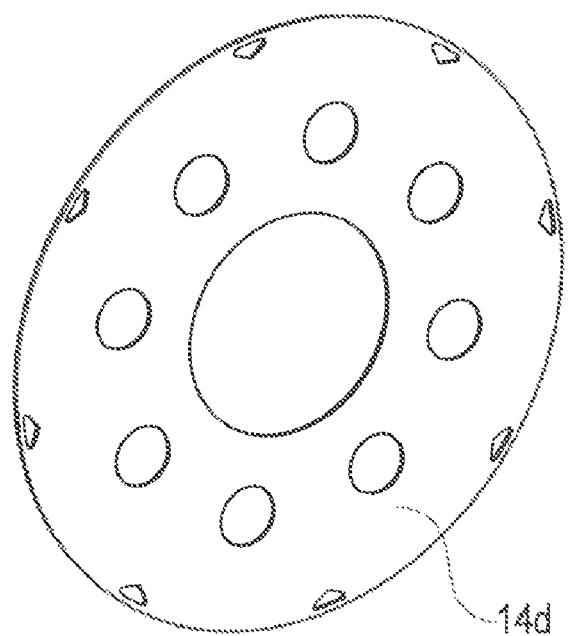
FIG. 10 is an external view of a rotor blank according to Embodiment 4 of the present invention.

With reference to FIGS. 9 and 10, a configuration of Embodiment 4 of the present invention will be explained. Embodiment 4 differs from Embodiment 3 in that, as illustrated in FIG. 10, a rotor blank 14*d* has no permanent magnet holes. Accordingly, as illustrated in FIG. 9, a divisional skew plane 16 is entirely covered with the rotor blank 14*d* made of nonmagnetic material without gaps.

However, each of a plurality of permanent magnets 6 has a skew structure with a predetermined circumferential angle with respect to each rotor core 2 and is spaced from the facing rotor core 2, like Embodiment 3. This is because the rotor blank 14*d* is made of nonmagnetic material instead of the same material as the rotor cores 2. The remaining configuration of Embodiment 4 is the same as Embodiment 3, and therefore, repetition of explanation is omitted.

Operation of the embodiment with the above-mentioned configuration will be explained. As stated above, the permanent magnets 6 that axially face each other are spaced from the axially facing rotor cores 2 by the rotor blank 14*d* made of nonmagnetic material interposed between them. When a rotating electrical machine is operated, the rotor blank 14*d* suppresses a demagnetizing field that is caused by an armature reaction at the divisional skew plane 16 and is applied from the rotor cores 2 to end faces of the permanent magnets 6. When assembling the rotor 1, the permanent magnets 6 are fixed with the rotor blank 14*d* made of nonmagnetic material interposed along the divisional skew plane 16. Accordingly, like Embodiment 2, Embodiment 4 allows the permanent magnets 6 to be easily positioned in an axial direction.

In this way, the rotor for a rotating electrical machine according to Embodiment 4 of the present invention spaces the permanent magnets 6 that axially face each other from the rotor cores 2 that axially face the permanent magnets 6 by the rotor blank 14*d* made of nonmagnetic material interposed between them. This prevents a demagnetizing field acting on the permanent magnets 6, thereby suppressing the demagnetization of the permanent magnets 6 and improving reliability. This is particularly effective when the permanent magnets 6 are magnetized after assembling (postmagnetized magnets) and when a skew structure is employed. The rotor blank 14*d* arranged along the divisional skew plane 16 is made of nonmagnetic material, to reduce a demagnetizing field acting on the permanent magnets 6, thereby suppressing the demagnetization of the permanent magnets 6 and further improving reliability.

Even if an adhesive to fix the permanent magnets 6 to the rotor cores 2 deteriorates or even during the assembling of the premagnetized permanent magnets 6, the axial positioning of the permanent magnets 6 is easily and accurately carried out because the divisional skew plane 16 is provided with the rotary blank 14*d* made of nonmagnetic material. This results in simplifying assembling steps including fine adjustment of the positions of the permanent magnets 6, reducing costs, and improving reliability.

Embodiment 5

Figure 11:
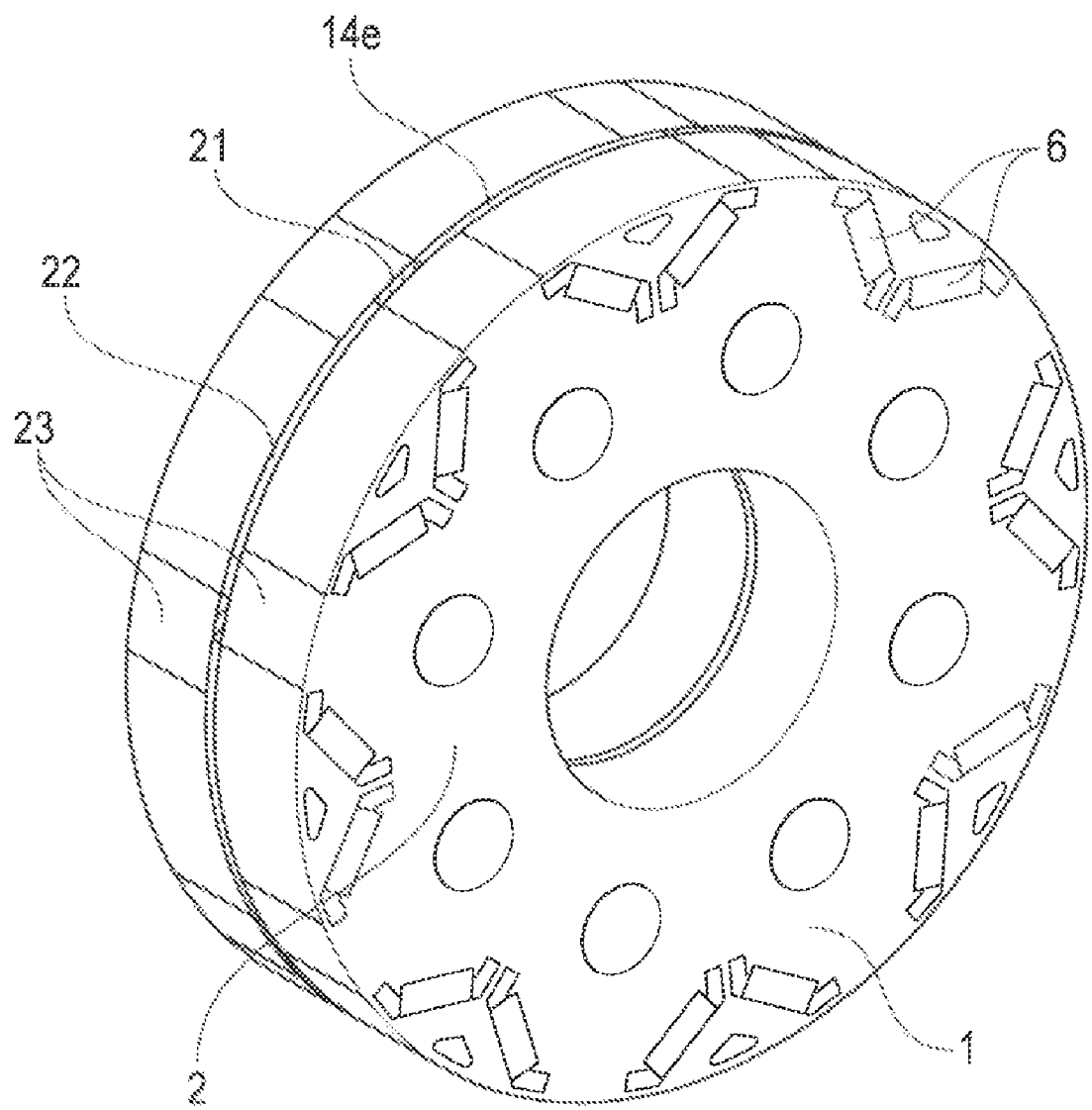
FIG. 11 is an external view of a rotor for a rotating electrical machine according to Embodiment 5 of the present invention.
Figure 12:
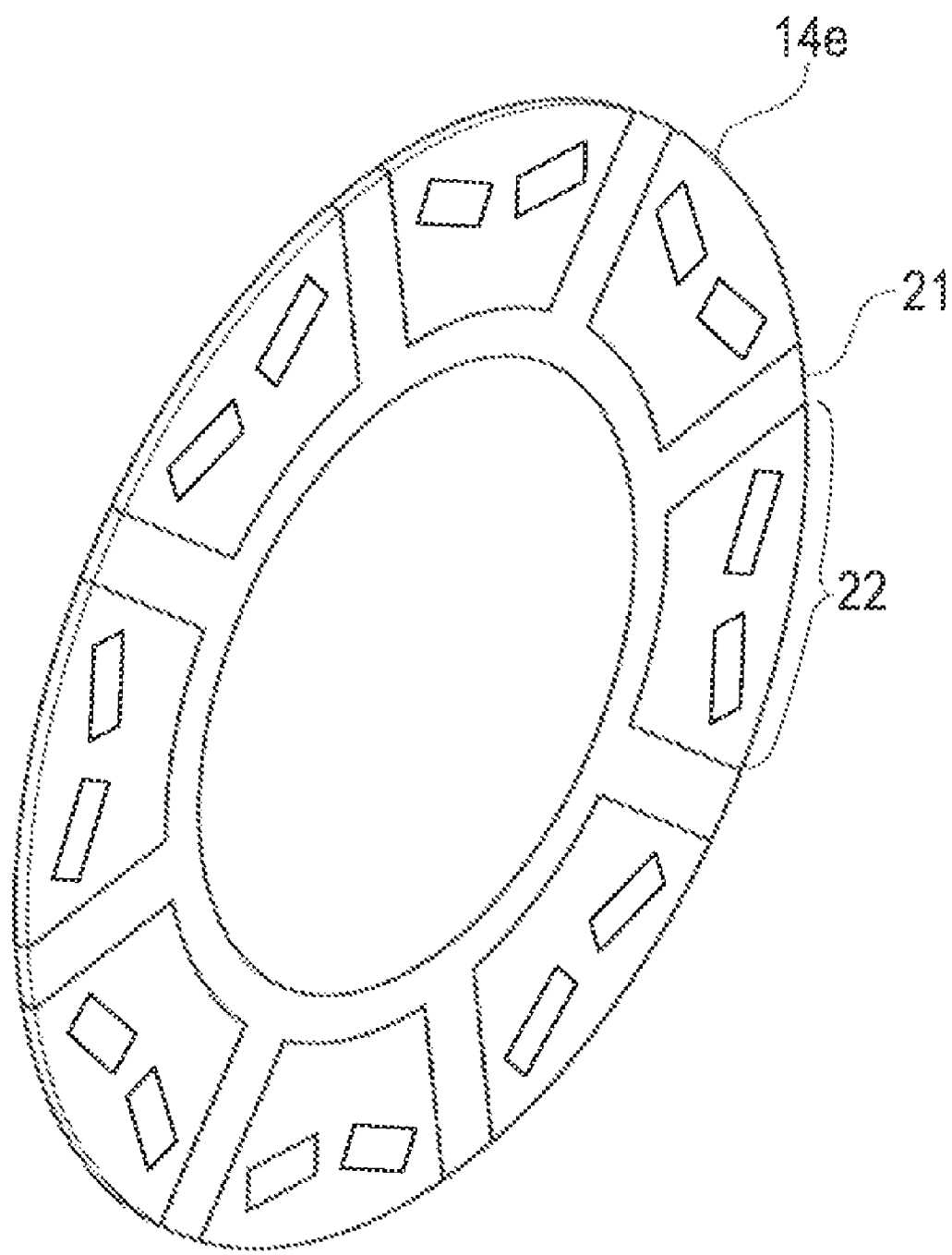
FIG. 12 is an external view of a rotor blank according to Embodiment 5 of the present invention.

With reference to FIGS. 11 and 12, Embodiment 5 of the present invention will be explained. In FIGS. 11 and 12, the same or equivalent structural elements as those of the related art and Embodiments 1 to 4 are represented with the same reference marks, to omit repetition of explanation.

In a rotor 1 illustrated in FIG. 11, a plurality of rotor cores 2 are stacked together, and on each rotor core 2, magnetic poles 23 are positioned as illustrated. Each rotor core 2 has the magnetic poles 23 like Embodiments 3 and 4. What is different from Embodiments 3 and 4 is that, as illustrated in FIG. 12, a rotor blank 14*e* has magnetic sections 21 and nonmagnetic sections 22.

The rotor blank 14*e* is made of magnetic material (magnetic sections 21) at positions of the magnetic poles 23 of the axially adjacent rotor cores 2 and nonmagnetic material (nonmagnetic sections 22) at nonmagnetic parts including positions where axially adjacent permanent magnets are present.

More precisely, the rotor blank 14*e* is made of magnetic material at positions the magnetic poles of the two axially adjacent rotor cores 2 circumferentially overlap each other on each side of the rotor blank 14*e*. As illustrated in FIG. 11, the magnetic sections 21 are at positions where the magnetic poles of the two adjacent rotor cores 2 circumferentially overlap each other on each side of the rotor blank 14e and correspond to sectors that include hatched part and extend toward the center of the rotor blank 14e.

The rotor blank 14e may have permanent magnet holes at locations where the permanent magnets adjoin. According to Embodiment 5, there are no permanent magnet holes and the parts in question are made of nonmagnetic material.

The permanent magnets 6 are circumferentially shifted rotor core by rotor core by a predetermined angle, to form a skew structure and are spaced from the rotor cores 2 that axially face the permanent magnets 6, like Embodiments 3 and 4.

The rotor 1 for a rotating electrical machine according to this embodiment has a cooling path to cool the sections made of nonmagnetic material of the rotor blank 14e. The cooling path is made by arranging a groove on a divisional skew plane 16 at, for example, gaps between the permanent magnets. The remaining configuration thereof is the same as Embodiment 4 and repetition of explanation is omitted.

Next, operation of Embodiment 5 with the above-mentioned configuration will be explained. As mentioned above, the permanent magnets 6 that axially face each other are spaced from the rotor cores 2 that axially face the permanent magnets by the nonmagnetic sections 22 of the rotor blank 14e interposed between them. When the rotating electrical machine is operated, the rotor blank 14e suppresses a demagnetizing field that is caused by an armature reaction at the divisional skew plane 16 and is applied from the rotor cores 2 to end faces of the permanent magnets 6.

When assembling the rotor 1, the permanent magnets 6 are fixed with the nonmagnetic sections 22 of the rotor blank 14e interposed along the divisional skew plane 16. Accordingly, like Embodiment 4, Embodiment 5 allows the permanent magnets 6 to be easily positioned in an axial direction. The rotor blank 14e has the magnetic sections 21 made of magnetic material at the magnetic poles, to form magnetic irregularities and provide reluctance torque. The cooling path provided for the nonmagnetic sections 22 of the rotor blank 14e is used to pass a coolant such as air and oil, to enhance the cooling of the end faces of the permanent magnets 6 on, for example, the divisional skew plane 16, thereby lowering the temperature of the permanent magnets 6.

In this way, the rotor for a rotating electrical machine according to Embodiment 5 of the present invention spaces the permanent magnets 6 that axially face each other from the rotor cores 2 that axially face the permanent magnets 6 by the nonmagnetic sections 22 of the rotor blank 14e interposed between them. This blocks a demagnetizing field acting on the permanent magnets 6, thereby suppressing the demagnetization of the permanent magnets 6 and improving reliability.

Further, the nonmagnetic sections 22 of the rotor blank 14e on the divisional skew plane 16 are made of nonmagnetic material, to further reduce the demagnetizing field acting on the permanent magnets 6, thereby suppressing the demagnetization of the permanent magnets 6 and improving reliability.

Even if an adhesive to fix the permanent magnets 6 to the rotor cores 2 deteriorates or even during the assembling of the premagnetized permanent magnets 6, the axial positioning of the permanent magnets 6 is easily and accurately carried out because the divisional skew plane 16 is provided with the nonmagnetic sections 22 of the rotary blank 14e. This results in simplifying assembling steps including fine adjustment of the positions of the permanent magnets 6, reducing costs, and improving reliability.

The rotor blank 14e has the magnetic sections 21 made of magneticmaterial at positions corresponding to the magnetic poles, to form magnetic irregularities, provide reluctance torque, and improve the torque and output of the rotating electrical machine.

The cooling path provided for the nonmagnetic sections 22 of the rotor blank 14e enhances the cooling of the end faces of the permanent magnets 6 on the divisional skew plane 16, thereby lowering the temperature of the permanent magnets 6, securing the coercive force (demagnetization resistivity) thereof, and improving reliability.

Embodiment 6

Figure 13:
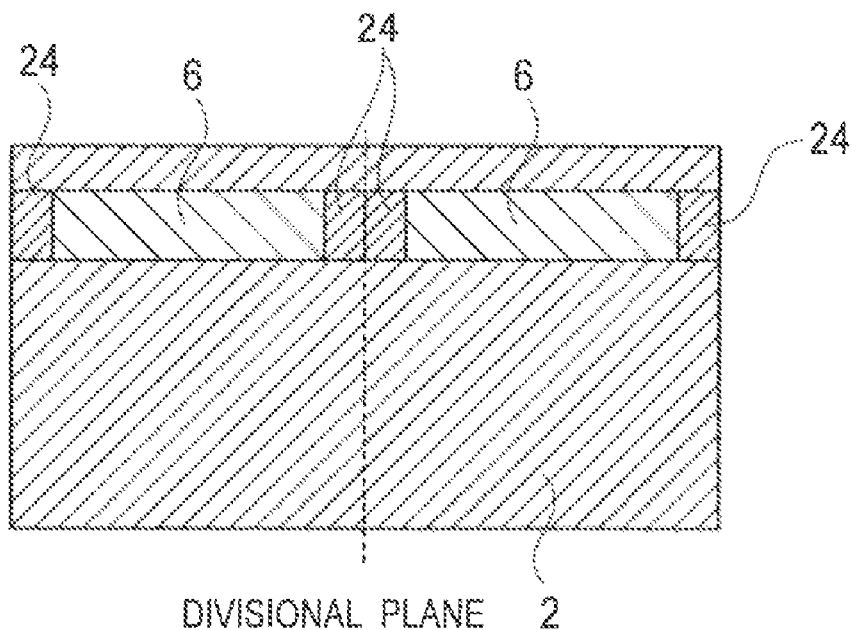
FIG. 13 is an axial section of a rotor for a rotating electrical machine according to Embodiment 6 of the present invention.

FIG. 13 is an axial section of a rotor for a rotating electrical machine according to Embodiment 6 of the present invention. Although the rotor 1 in FIG. 13 has no skew structure, it may have a skew structure. This embodiment differs from Embodiments 1 to 5 in that it has no rotor blank. However, it may have a rotor blank. A plurality of permanent magnets 6 are each made of a demagnetization resistive magnet (high-coercive-force permanent magnet 24) at an end face that faces a divisional plane. Namely, the high-coercive-force permanent magnet 24 forms a part of the permanent magnet 6. The remaining configuration of this embodiment is the same as Embodiments 1 to 5 and repetition of explanation is omitted.

Next, operation of the embodiment with the above-mentioned configuration will be explained. As explained above, each of the permanent magnets 6 that axially face each other has the magnet (high-coercive-force permanent magnet 24) having demagnetization resistivity at an end facing the divisional plane. When the rotating electrical machine is operated, improved demagnetization resistivity is demonstrated against a demagnetizing field that is caused by an armature reaction and is applied from rotor cores 2 at the divisional plane.

A not-illustrated cooling unit (for example, the above-mentioned cooling path) may be arranged to cool the end face of each permanent magnet 6 facing the divisional plane. In this case, the not-illustrated cooling path passes a coolant such as air and oil, to enhance the cooling of the end faces of the permanent magnets 6 facing the divisional plane, thereby lowering the temperature of the permanent magnets 6.

In this way, the rotor for a rotating electrical machine according to Embodiment 6 of the present invention provides each end of each of the permanent magnets 6 that axially face each other with a magnet (high-coercive-force permanent magnet 24) having demagnetization resistivity. Without regard to a demagnetizing field acting on the permanent magnets 6, the embodiment can improve the demagnetization resistivity of the permanent magnets 6, suppress demagnetization thereof, and improve reliability.

If the not-illustrated cooling unit is arranged to cool the end face of each permanent magnet 6 facing the divisional plane, it enhances the cooling of the end faces of the permanent magnets 6 facing the divisional plane, thereby lowering the temperature of the permanent magnets 6, securing the coercive force (demagnetization resistivity) thereof, and improving reliability.

Embodiment 7

Figure 14:
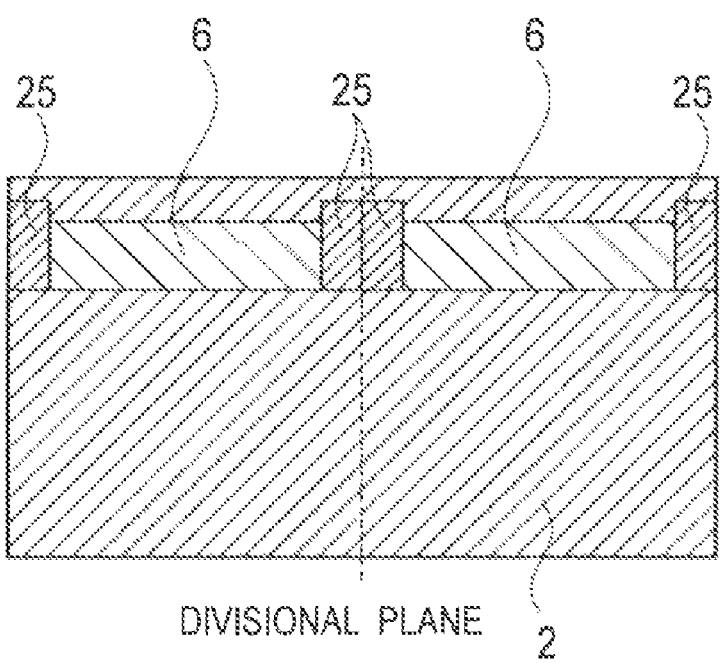
FIG. 14 is an axial section of a rotor for a rotating electrical machine according to Embodiment 7 of the present invention.
Figure 15:
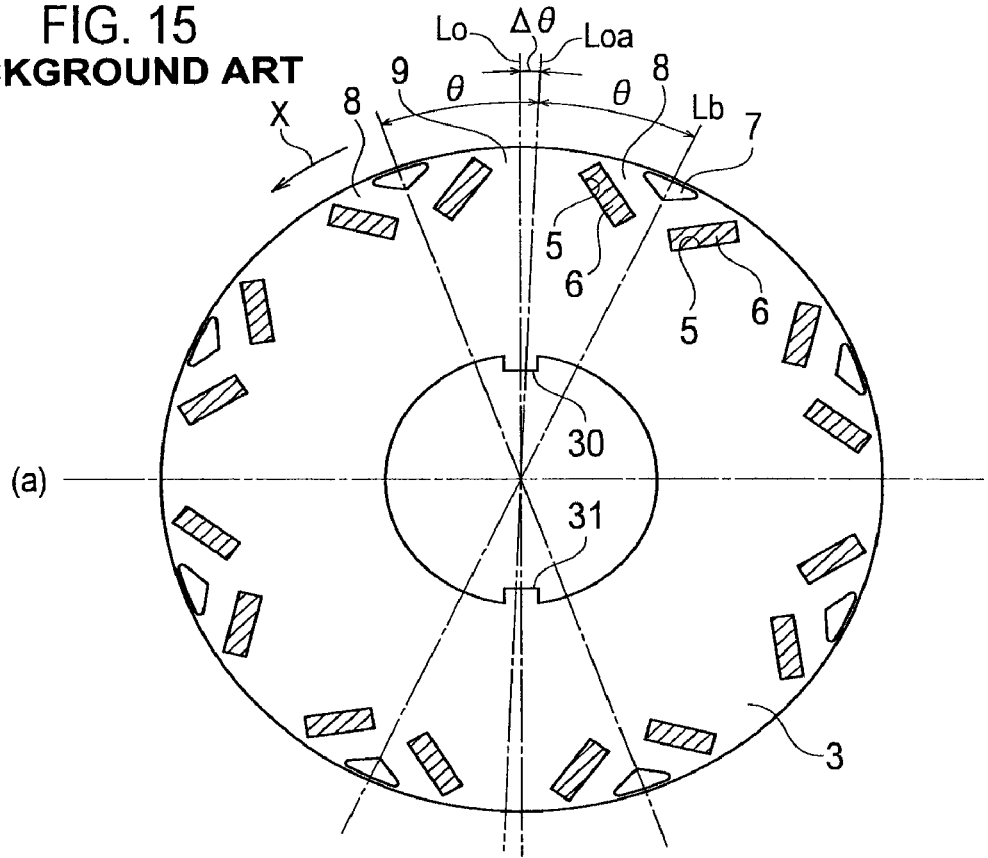
FIG. 15 is a diametrical section of a rotor for a rotating electrical machine according to a related art.
Figure 16:
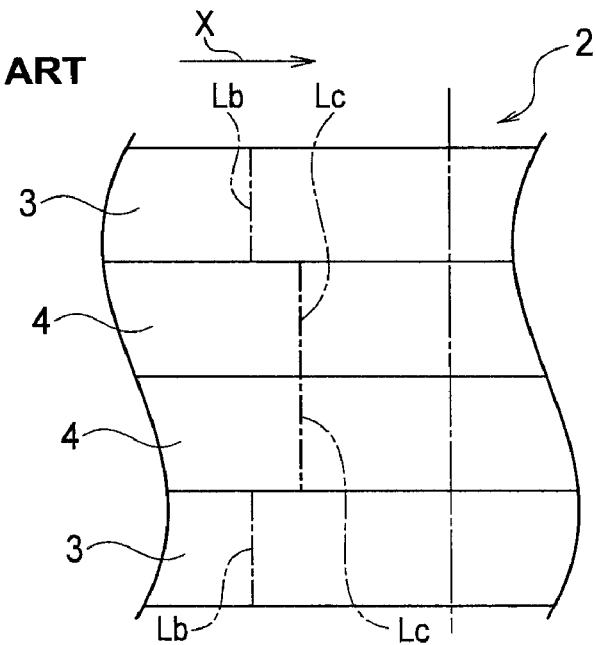
FIG. 16 is a partial top view of the rotor for a rotating electrical machine according to the related art.

FIG. 14 is an axial section of a rotor for a rotating electrical machine according to Embodiment 7 of the present invention. Although the rotor 1 in FIG. 14 has no skew structure, it may have a skew structure. This embodiment differs from Embodiments 1 to 5 in that it has no rotor blank. However, it may have a rotor blank. Each of permanent magnets 6 has an end face (permanent magnet 25) facing a divisional plane made of a thick magnet (permanent magnet 25) that is thicker in a radial direction of the rotor than the remaining part (permanent magnet 6). Namely, the permanent magnet 6 includes the thick magnet (permanent magnet 25) at the end facing the divisional plane, and at the remaining part, has a normal thickness. The remaining configuration of this embodiment is the same as Embodiment 6, and therefore, repetition of explanation is omitted.

Next, operation of the embodiment with the above-mentioned configuration will be explained. Each end facing the divisional plane of each of the permanent magnets 6 that axially face each other is provided with the thick magnet (permanent magnet 25). When the rotating electrical machine is operated, high magnetic force that is present at the divisional plane resists against a demagnetizing field that is caused by an armature reaction and is applied from the rotor cores 2, thereby improving demagnetization resistivity.

In this way, the rotor for a rotating electrical machine according to Embodiment 7 forms each end facing the divisional plane of each of the permanent magnets that axially face each other with the thick magnet (permanent magnet 25), to increase magnetic force acting against a demagnetizing field on the permanent magnets 6, heighten the demagnetization resistivity of the permanent magnets 6 at the divisional plane and end faces thereof, suppress demagnetization, and improve reliability.

INDUSTRIAL APPLICABILITY

The rotors for rotating electrical machines according to the present invention are applicable to rotating electrical machines and vehicles that employ the rotating electrical machines as driving sources.

The invention claimed is:

1. A rotor for a rotating an electrical machine, comprising:
   a plurality of rotor cores each formed by laminating plural steel plates, the plurality of rotor cores being arranged in a rotation axis direction and being spaced from each other, to constitute the rotor;
   a plurality of permanent magnets axially divided by the rotor cores and circumferentially arranged on each of the rotor cores, to circumferentially form magnetic irregularities; and
   a rotor blank arranged in a space formed between those of the rotor cores that are adjacent to each other in the rotation axis direction;
   the permanent magnets being circumferentially shifted from rotor core to adjacent rotor core by a predetermined angle, to form a skew structure;
   the rotor blank including permanent magnet holes at positions where the permanent magnets adjoin each other to form the skew structure in the rotation axis direction; and
   the permanent magnet holes being formed so that each hole permits both end faces of the permanent magnets to partly get in contact with each other therein and to form a gap where the ends of the permanent magnets are not present.

2. The rotor for a rotating electrical machine as set forth in claim 1, wherein:
   the rotor blank is made of nonmagnetic material.

3. The rotor for a rotating electrical machine as set forth in claim 1, wherein:
   the rotor blank is made of magnetic material at positions of magnetic poles of the rotor cores that are adjacent to each other in the rotation axis direction and nonmagnetic material at parts other than the positions made of magnetic material, including parts where the permanent magnets adjoin each other in the rotation axis direction.

4. The rotor for a rotating electrical machine as set forth in claim 3, further comprising:
   a cooling path to cool the parts of the rotor blank made of nonmagnetic material.

5. The rotor for a rotating electrical machine as set forth in claim 1, wherein:
   each of the permanent magnets includes, at an end thereof that faces a divisional plane, a demagnetization resistive magnet.

6. The rotor for a rotating electrical machine as set forth in claim 1, comprising:
   a cooling unit to cool a divisional-plane-facing end of each of the permanent magnets.

* * * * *